(12) United States Patent
Neidhardt

(10) Patent No.: US 11,859,684 B2
(45) Date of Patent: Jan. 2, 2024

(54) RUBBER ELASTIC BEARING FOR A DRIVE UNIT IN A MOTOR VEHICLE

(71) Applicant: Kiekert AG, Heiligenhaus (DE)

(72) Inventor: Andreas Neidhardt, Sassenburg (DE)

(73) Assignee: Kiekert AG, Heiligenhaus (DE)

( * ) Notice: Subject to any disclaimer, the term of this patent is extended or adjusted under 35 U.S.C. 154(b) by 111 days.

(21) Appl. No.: 16/972,029

(22) PCT Filed: May 20, 2019

(86) PCT No.: PCT/DE2019/100447
§ 371 (c)(1),
(2) Date: Dec. 4, 2020

(87) PCT Pub. No.: WO2019/233517
PCT Pub. Date: Dec. 12, 2019

(65) Prior Publication Data
US 2021/0239175 A1 Aug. 5, 2021

(30) Foreign Application Priority Data
Jun. 6, 2018 (DE) ............ 10 2018 004 470.0

(51) Int. Cl.
*F16F 1/373* (2006.01)
*F16F 1/36* (2006.01)
(Continued)

(52) U.S. Cl.
CPC ............ *F16F 1/373* (2013.01); *F16F 1/3605* (2013.01); *F16F 1/371* (2013.01); *F16F 15/08* (2013.01);
(Continued)

(58) Field of Classification Search
CPC .......... F16F 1/373; F16F 1/3605; F16F 1/371; F16F 2224/025; F16F 2226/04; F16F 2230/0005; F16F 2230/02; F16F 15/08
See application file for complete search history.

(56) References Cited

U.S. PATENT DOCUMENTS

| 20,998 | A | * | 7/1858 | Field | F16F 1/371 267/141.1 |
|---|---|---|---|---|---|
| 2,951,674 | A |  | 9/1960 | Rice | |

(Continued)

FOREIGN PATENT DOCUMENTS

| DE | 3341315 A | * | 5/1985 | ............ E05F 5/022 |
|---|---|---|---|---|
| DE | 3610828 A | * | 10/1987 | ............ E05F 5/022 |

(Continued)

OTHER PUBLICATIONS

Translation of International Search Report dated Aug. 19, 2019, for International Patent Application No. PCT/DE2019/100447.

*Primary Examiner* — Xuan Lan Nguyen
(74) *Attorney, Agent, or Firm* — Renner, Otto, Boisselle & Sklar, LLP

(57) ABSTRACT

A rubber elastic bearing for securing a drive unit in a motor vehicle in an uncoupled manner. The bearing can be assembled between as housing of a drive unit and a support component, and the bearing can be held at least indirectly in the support component in a form-fitting manner. A joining aid for the bearing is provided such that a secure joint of the form-fitting connection with the support component can be achieved.

18 Claims, 1 Drawing Sheet

(51) Int. Cl.
*F16F 1/371* (2006.01)
*F16F 15/08* (2006.01)

(52) U.S. Cl.
CPC ..... *F16F 2224/025* (2013.01); *F16F 2226/04* (2013.01); *F16F 2230/0005* (2013.01); *F16F 2230/02* (2013.01)

(56) References Cited

U.S. PATENT DOCUMENTS

| | | |
|---|---|---|
| 4,643,386 A | 2/1987 | Chastine |
| 7,246,797 B2 * | 7/2007 | Gustavsson ........... F16F 15/022 267/269 |
| 7,566,081 B2 * | 7/2009 | Aoyama ................. E05F 5/022 296/1.03 |
| 9,106,114 B2 | 8/2015 | Bendel |
| 9,388,874 B2 * | 7/2016 | Gustavsson ............ F16F 7/108 |

FOREIGN PATENT DOCUMENTS

| | | | |
|---|---|---|---|
| DE | 10048051 A1 | 4/2002 | |
| DE | 202008010051 U1 | 12/2009 | |
| DE | 102010007073 A1 | 8/2011 | |
| DE | 202010003409 U1 | 8/2011 | |
| DE | 102017102258 A1 * | 8/2018 | ............ E05B 77/36 |
| EP | 1533162 A1 | 5/2005 | |
| EP | 1703146 A2 | 9/2006 | |
| FR | 2680717 A1 | 3/1993 | |
| FR | 2808854 A1 | 11/2001 | |
| JP | S6159039 A | 3/1986 | |
| WO | 2001092752 A1 | 12/2001 | |

\* cited by examiner

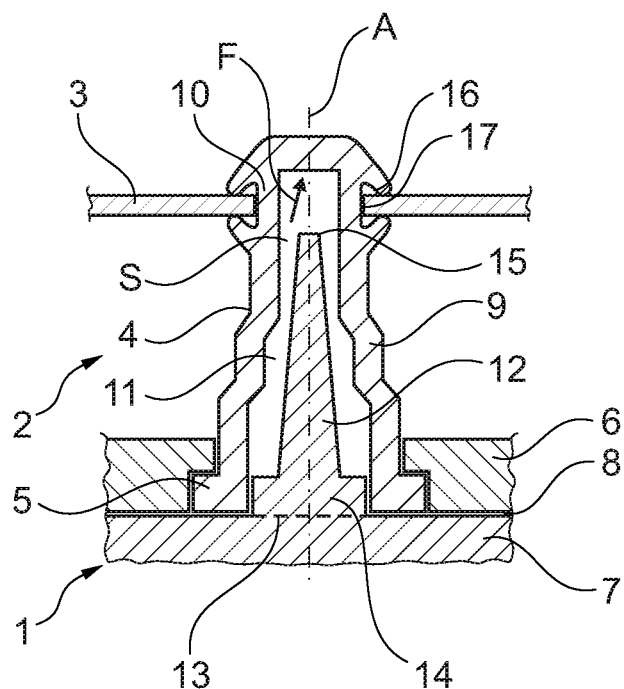
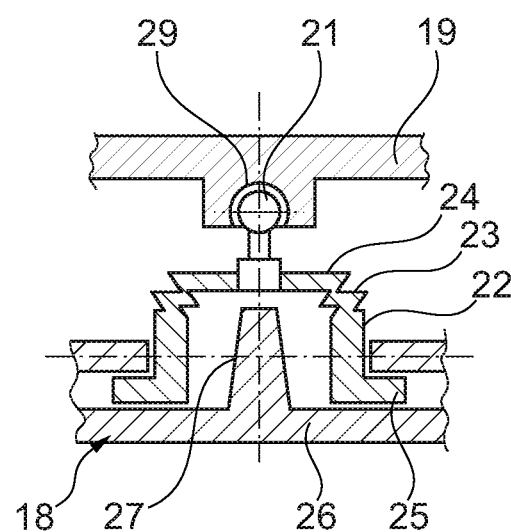
Fig. 1
Fig. 2
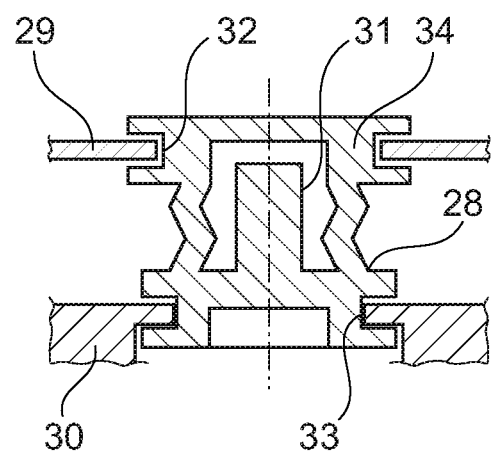
Fig. 3

RUBBER ELASTIC BEARING FOR A DRIVE UNIT IN A MOTOR VEHICLE

FIELD OF DISCLOSURE

The invention relates to a rubber-elastic bearing for the decoupled fastening of a component, in particular a drive unit, in a motor vehicle, it being possible for the elastic bearing to be installed between a housing of the component and a carrier component and for the elastic bearing to be held interlockingly at least indirectly in the carrier component.

BACKGROUND OF DISCLOSURE

In order to increase comfort in modern motor vehicles, electrically assisted motor vehicle assemblies are being used increasingly frequently, which assemblies, for example, support the closing and/or opening of a locking device or, for example, open or close a motor vehicle door or tailgate at least in regions. These motor vehicle assemblies thus have an electrically driven motor which is directly or indirectly connected to the locking or actuating device. For reasons of accessibility or space, for example, such a motor vehicle assembly can also be arranged at a distance from a locking device, for example, and be connected to the motor vehicle latch, for example by means of a Bowden cable.

The motor is generally an electric motor. The motor vehicle assemblies that can be acted upon by the motor or electric motor are, for example, mirrors, seats, steering columns, windows, or closing devices. Motor vehicle door assemblies are particularly preferably driven and operated by means of the motor. These are the exterior mirrors already mentioned by way of example, or other elements that are attached in or on the motor vehicle door and can be adjusted by means of the motor. The motor is very particularly preferably used to operate or act upon a closing and/or opening device in or on a motor vehicle locking system.

SUMMARY OF DISCLOSURE

In this context, the drive unit in question is usually designed as an external drive unit, i.e. usually operates on the closing and/or opening device, which is arranged separately therefrom, via a Bowden cable or another connecting means. Such a closing and/or opening device generally serves to move the motor vehicle door from, for example, a pre-closed position into a main closed position in a motorized manner. As a result, it is sufficient for an operator to merely bring the motor vehicle door in question into the pre-closed position or, in other words, a pre-ratchet position. The main closed position, or in other words the main ratchet position, is then assumed automatically and is achieved by means of the motor of the external drive unit.

In addition, motor-operated opening devices for the motor vehicle door latch are also known in principle. These ensure that the motor vehicle door is opened in a motorized manner. Such closing and/or opening devices are mainly used in expensive automobiles and primarily serve to improve comfort. Security aspects also play an increasingly important role, since a motor vehicle having a closing aid, for example, always ensures that the associated motor vehicle door is in its main ratchet position while driving, in which position the motor vehicle occupants are protected with maximum safety. An example of such a closing and/or opening device is described in DE 100 48 051 A1.

Closing aids are also known from practice, which, as is conventional, are attached inside the motor vehicle door. This increasingly poses the problem of decoupling noises inevitably caused by the engine from the interior, thus ensuring the quietest possible operation.

A motor vehicle door having an inner structural element and at least one support element has become known from DE 20 201 0 003 409 U1, the support element being connected to the structural element at at least one fastening point and the support element being pivotably mounted to assume a relative installation position. A motor vehicle assembly is fastened to the support element by means of rubber-elastic bearings, the motor vehicle assembly being connected to a locking device via a Bowden cable.

In order to achieve low-noise and simultaneously secure mounting of a motor vehicle assembly, a drive unit for a motor vehicle assembly is known from the generic DE 20 2008 010 051 U1, in which the motor vehicle assembly is fastened in at least one rubber-elastic bearing in order to fix the motor to a base. The bearing has different spring constants in the axial direction and/or radial direction, such that a wide range of dynamic loads on the motor vehicle assembly can be eliminated and low-noise operation of the motor can be ensured. The technical object of the invention is to improve a drive unit of this type for a motor vehicle assembly. A further object of the invention is to allow easy installation in the motor vehicle, while at the same time ensuring an improvement in the acoustics. Finally, the object of the invention is to provide a structurally simple and inexpensive solution.

To achieve the object, according to the invention at least one rubber-elastic bearing for the decoupled fastening of a component, in particular a drive unit, is provided in a motor vehicle, it being possible for the elastic bearing to be mounted between a housing of the component and a carrier component and for the elastic bearing to be held interlockingly at least indirectly in the carrier component, a joining aid being provided for the bearing, such that secure joining, in particular insertion, of the interlocking connection to the carrier component can be achieved. The design according to the invention of the rubber-elastic bearing makes it possible to simplify the installation of the rubber-elastic bearing and to achieve secure joining to the carrier component.

In particular, the joining aid serves to facilitate the connection with the carrier component, the joining aid being able to introduce a direct force into the region of the rubber-elastic bearing that can be connected to the carrier component. In other words, during the insertion of the rubber-elastic bearing into the carrier component by means of the joining aid, a direct force can be exerted on the rubber-elastic bearing and in particular on the part of the rubber-elastic bearing that is connected to the carrier component. The rubber-elastic bearing is constructed in at least two parts, preferably three parts, more preferably four parts. A first part of the rubber-elastic bearing is connected to the housing of the drive unit and at least one second part of the rubber-elastic bearing can be connected to the carrier component.

In the case of a multi-part design of the rubber-elastic bearing, for example an elongation, an accordion-like intermediate part and/or a reinforcing rib can be arranged between the first and second part of the rubber-elastic bearing. The function of these intermediate elements is described here only by way of example; of course, depending on the requirements of the rubber-elastic mounting, any embodiments, including design-related embodiments, can be arranged between the first and second parts of the rubber-elastic mounting. It is essential for the invention that by means of the joining aid, starting from the first part of the rubber-elastic bearing, a force component can be introduced directly into the second part of the rubber-elastic bearing. The joining aid can thus be regarded as a secondary force transmission means, the joining aid transmitting or being able to transmit a second force component from the first part of the rubber-elastic bearing to the second part of the rubber-elastic bearing in addition to the basic design of the rubber-elastic bearing.

As already described above, the drive unit for a motor vehicle unit includes electrically driven motors which, in combination with a gear, can operate a Bowden cable, for example, or in which the motor acts directly or indirectly on a movement device in the motor vehicle, for example. Drive units can, for example, drive an exterior mirror, move a side window or support a door or tailgate movement, to name just a few examples of areas of application of a drive unit for a motor vehicle assembly. The drive unit is preferably used for a closing and/or opening unit in or on a motor vehicle latch.

Electric motors are preferably used as motors. Electric motors offer the advantage that the required energy can be provided in the motor vehicle and a voltage supply can thus be easily implemented. In addition, electric motors can be easily adapted to different requirements and, with the aid for example of a gear, such as a worm gear, ensure large gear ratios and provide a wide variety of adjusting or pivoting movements with low or high forces. Electric drives also offer a cost advantage, and therefore a structurally favorable solution can be made possible.

Electric motors generate noises and vibrations, which can lead to unwanted noises in particular when used in motor vehicles. For acoustic decoupling, rubber-elastic bearings are used which acoustically decouple the motor and/or the housing surrounding the motor. The acoustic decoupling takes place against a carrier component to which the drive unit is connected for positioning and storage in the motor vehicle.

Separate door modules can serve as the carrier component, but the carrier component can also be formed directly of, for example, a door panel and/or a side panel. The carrier component accommodates the drive unit, it being possible to fasten the drive unit to the carrier component via the rubber-elastic bearing and by means of a joining means.

If, in the context of the invention, reference is made to joining or inserting the rubber-elastic bearing into the carrier component, this can include different forms of connection between the rubber-elastic bearing and the carrier component. On the one hand, the rubber-elastic material of the bearing can directly engage in the carrier component, but it is also conceivable that, for example, joining means are formed on or molded onto the rubber-elastic bearing, which joining means, for example, are also made of different materials and can be connected to the carrier component. By way of example, reference is made here to a spherical extension made of plastics material or metal, which is molded onto the rubber-elastic bearing or connected to the rubber-elastic bearing, the spherical extension being insertable, for example, into a corresponding opening in the carrier component.

Advantageously, the bearing can have a recess and the joining aid can extend into the recess at least in regions. The bearing is preferably formed in the shape of a hollow cylinder, the shape of the bearing, which can be described as a hollow cylinder, making it possible for the component, in particular the drive unit, to be fastened in a decoupled manner. Due to the hollow-cylindrical shape, a high elasticity can be achieved, which assists decoupling of, for example, vibrations of the drive unit on the carrier component. If the joining aid now extends into the recess or the cavity of the bearing, a force can be transmitted into the interior of the bearing by means of the joining aid. It should be noted here that the bearing can of course be formed in the shape of a hollow cylinder, but the recess is preferably formed as a closed hollow-cylindrical shape so that a closed recess is produced in the bearing. A force can be exerted on the recess by means of the joining aid, such that the recess can experience an additional force component, i.e. a secondary force and/or joining component, or a force component is available during joining to the carrier component.

In a further embodiment, the joining aid ends at a distance from one end of the recess, the distance corresponding to the elasticity of the elastic bearing. Through the design of the cooperating partners, i.e. the joining aid and the elastic bearing, it is possible to carry out the joining more securely and even in hard-to-reach places on the motor vehicle. If the elastic bearing is now provided with a recess such that the bearing forms a hollow body, and the joining aid extends into the recess and ends so far in front of the end of the recess, i.e. before the end of the recess of the hollow body, that the distance between the joining aid and the end of the recess is matched to the elasticity of the elastic bearing, this can allow the insertion or joining of the bearing and at the same time the elastic bearing can be maximally deformed. In other words, the elastic bearing is not restricted in its elasticity by the joining aid. Depending on the plastics material used, such as natural rubber, as an elastic material for the bearing and in particular as a rubber-elastic bearing, the damping properties of the bearing can vary or be varied.

The main task of the bearing is acoustic decoupling between the component and the carrier component in the motor vehicle. By operating the component and/or, for example, due to an electric drive that is arranged in the component, vibrations or movements can be generated which are decoupled from the carrier component by means of the at least one bearing. If the joining aid is so far removed from the end of the recess of the hollow body of the bearing that the elastic bearing can always be deformed according to its maximum elasticity, the joining aid can serve as a joining aid during the insertion of the bearing into the carrier component, although due to the actual function of the bearing as a fastening means, the bearing can provide an elastic decoupling for the component without hindrance.

A further advantageous embodiment variant of the invention results when the elastic bearing has indentations, in particular radial grooves, at least in regions and the recess extends into the region of the indentation. The elastic bearing can, for example, be connected to the carrier component by means of radial grooves, i.e. slotted indentations on the circumference. If, for example, an opening in the form of a bore is provided in the carrier component, and the elastic bearing has an annular groove that fits interlockingly into the bore, then secure holding can be achieved by means of the elastic bearing. If the joining aid now extends so far into the recess that the maximum elasticity of the bearing is ensured and the recess extends into the region of the indentations of the bearing, the joining aid can push the bearing through the bore and thus ensure easy and secure installation of the bearing. "Pushing through" means that during the joining of the elastic bearing, the joining aid exerts a force on the end of the recess in the bearing, such that the annular groove in the elastic bearing can be securely inserted into the bore. The joining aid is used for the defined introduction of force during the insertion of the bearing into the carrier component.

In a further design variant of the invention, there is an advantage if a geometric shape of the end of the recess cooperates with a geometric shape of the joining aid, in particular interlockingly engages into the geometric shape of the bearing. By means of a cooperating shape between the recess or the cavity in the bearing and the corresponding geometric design of the joining aid, an additional securing means can be provided for joining the bearing to the carrier component. In particular in the case in which the bearing enters into a circumferential connection with the carrier component, a uniform force distribution can be introduced into the end of the recess by means of the joining aid.

If the cavity in the bearing is round, for example, a uniform circumferential force can be introduced into the bearing during joining by means of a round end of the joining aid. Due to the matching shapes of the recess and the joining aid, safety during joining can be increased at the same time, since the bearing is minimally stressed by an adapted shape between the joining aid and the bearing, and therefore no damage can be caused to the bearing by means of the joining aid during joining, or the risk of damage to the bearing is reduced to a minimum. If round, angular, star-shaped or other geometric shapes are conceivable between the joining aid and the end of the recess in the bearing, it is also conceivable that the cooperating surfaces between the joining aid and the end of the recess engage into one another interlockingly. For example, the joining aid can have a curvature which engages in a convex shape of the end of the bearing. This provides maximum safety when joining the bearing to the carrier component.

If the joining aid is designed such that the elastic bearing can be deformed independently of the joining means in the installed state, this results in a further advantageous design variant of the invention. The joining aid preferably extends into the interior of the elastic bearing such that only the region of the elastic bearing which is to be joined to the carrier component can be acted upon with a force by means of the joining aid. The elastic bearing is preferably symmetrical and, for example, round and has a first fastening part on the housing and a second fastening part on the carrier component. As already described above, there may be structurally different configurations of the elastic bearing between the first and second fastening parts of the elastic bearing.

The elastic bearing is preferably hollow and can be described as cylindrical, although the cylindrical shape can of course have shoulders and/or, for example, an accordion-like transition region. This elastic region between the first and second fastening parts of the elastic bearing serves primarily to absorb the vibrations from the component and to decouple the component from the carrier component. The joining aid is designed such that elastic deformation of the bearing can be carried out without restriction, such that the joining aid can advantageously connect the second part of the elastic bearing to the carrier component in the event of joining, but at the same time does not bring about any restriction with regard to the elastic decoupling.

In addition, the joining aid can serve as a securing element, specifically when, for example, the component to be decoupled is exposed to a strong or excessive load, such that the elasticity of the bearing is excessively stressed. In this case, the joining aid can, for example, support the intermediate region between the first and second connecting parts of the bearing and thus serve as an additional support means in the elastic bearing.

Another advantageous design variant results when the elastic bearing can be installed between a first housing part and a second housing part of the housing. Advantageously, the housing of the component can have a multi-part design, such that the bearing can be accommodated between a first housing part and a second housing part. This can be advantageous in several respects: for one thing, it makes installation of the bearing easier, with automated installation also being possible, and at the same time the second housing part can allow the joining aid to be directly incorporated. On the one hand, the joining aid can be installed as a separate component on the second housing part, for example, but it is also conceivable that the joining aid can be integral with the second housing part.

In addition, the second housing part can advantageously serve as a guiding and/or positioning means for the bearing during installation. For example, a contour and/or cut-out corresponding to the bearing may be present in the second housing part in order to position the bearing securely. It is also conceivable that the second housing part offers an accommodating surface for the bearing and at the same time the first housing part fixes the bearing. In this case, the elastic bearing can be held interlockingly between the first and second housing parts.

If the joining aid is integral with the second housing part, this results in an advantageous design variant of the invention. The design of the joining aid as part of the second housing part offers the advantage that it is possible to work with the smallest possible number of components. In addition, the joining aid can be aligned very precisely with respect to the elastic bearing, since the positioning of the joining aid coincides directly with the manufacture of the second housing part. In addition, there are favorable force profiles when the bearing is installed on the carrier component.

In a further design variant of the invention, the functional unit can be integral with the elastic bearing. According to the invention, it is also conceivable that the elastic bearing itself is designed having a joining aid. In this case, the joining aid can be arranged, for example, in the interior of the elastic bearing, such that a force transmission can be transmitted from a first part of the bearing to a second part of the bearing. An integral design of the elastic bearing with the joining aid reduces the number of components required to achieve the advantages according to the invention to a minimum.

If the elastic bearing has a connection element, in particular an accordion-like connection element, this produces a further design variant of the invention. An accordion-like connection element between the first and second parts of the elastic bearing can serve to compensate for tolerances and is simultaneously able to provide a favorable decoupling for the component with respect to the carrier component. In addition to a design of the connection element in the form of an accordion, different wall thicknesses are of course also conceivable in the bearing and/or a stepped design can be formed in the connection element. Depending on the design specifications and the forces that have to be absorbed, a design can be implemented with regard to the elasticity of the bearing.

BRIEF DESCRIPTION OF DRAWINGS

The invention is explained in more detail in the following with reference to the attached drawings on the basis of preferred exemplary embodiments. However, the principle applies that the exemplary embodiments do not limit the invention, but are merely embodiments. The features shown can be implemented individually or in combination with further features of the description.

In the drawings:

FIG. 1 shows a design of a hollow profile-shaped bearing in an arrangement between a carrier component and a housing, FIG. 2 shows a further design variant in a side view and in section with a bearing between a housing and a carrier component, the bearing being shown with a spherical head connection with respect to the carrier component, and FIG. 3 is a further side view and an exemplary embodiment of a bearing between a housing and a carrier component with an integrally formed joining aid as part of the elastic bearing.

DETAILED DESCRIPTION

FIG. 1 shows a drive unit 1 only in regions and in the region of a decoupled fastening on a carrier component 3. FIG. 1 shows a section through a rubber-elastic bearing 4, the rubber-elastic bearing 4 being accommodated in the housing 8 with a first portion 5 between a first housing part 6 and a second housing part 7. The rubber-elastic bearing 4 extends from the first portion via a connection element 9 to a second portion 10 toward the carrier component 3. In this embodiment, the rubber-elastic bearing 4 is designed as a hollow profile having a recess 11. The rubber-elastic bearing 4 is shown in FIG. 1 in section and in a side view, the rubber-elastic bearing 4 in this exemplary embodiment being describable as cylindrical or round. The connection element 9 forms a stepped hollow-cylindrical profile.

A joining aid 12 extends into the recess 12. In this exemplary embodiment, the joining aid 12 is integral with the second housing part 7, but it is also conceivable that the joining aid 12 can be connected to the second housing part 7 as a separate component along a dividing line 13. In this case, the joining aid 12 could be connected to the second housing part as a separate component. The joining aid 12 extends, starting from the first portion 5 of the rubber-elastic bearing, through the connection element 9 into the region of the second portion 10 of the rubber-elastic bearing 4. As indicated by the axis of symmetry H, at least the rubber-elastic bearing 4 and the joining aid 12 are symmetrical.

In any case, the joining aid 12 extends from the first portion 5, in which the bearing 4, the electric motor, the first housing part 6 and the second housing part 7 and an extension 14 are integrated or fixed, into the connection element 9. The shape of the joining aid 12 is selected such that the bearing 4 acts independently of the joining aid 12 in the context of the decoupling movement between the housing 8 and the carrier component 3. In other words, the rubber-elastic bearing 4 is not impaired by the joining aid in the context of decoupling the drive unit 1 from the carrier component 3.

An axial end 15 of the joining aid 12 extends into the second portion 10 of the bearing 4. The second portion 10 can also be described as a joining region 10. In the joining region 10, a circumferential annular groove 16 is formed in the bearing 4 which circumferentially surrounds a bore 17 in the carrier component 3 and in which the circumferential annular groove 16 is held. The joining region 10 thus fits interlockingly into the carrier component 3. The annular groove 16 advantageously makes it possible to connect the bearing 4 to carrier components 3 of different thicknesses, such that the elastic bearing 4 can be used in many different regions of the vehicle.

As can be clearly seen in FIG. 1, a force F can be introduced into the joining region 10 by means of the joining aid 12 in order to securely connect the joining region 10 to the carrier component 3. The axial end 15 has sufficient play S in order, on the one hand, to allow easy joining of the joining region 10 and, on the other hand, not to impair the elasticity of the bearing 4. The joining aid 12 can thus ensure easy and secure joining of the bearing 4 to the carrier component 3.

FIG. 2 shows an alternative embodiment of a connection between a drive unit 18 and a carrier component 19. The carrier component 19 has a spherical cut-out 20 into which a spherical head 21 can be interlockingly inserted. The spherical head 21 can be made of plastics material or metal, for example. An advantageous material pairing results when the carrier component 19 is made of plastics material and the spherical head 21 is made of a metal material. The spherical head 21 is, for example, integrally bonded to a rubber-elastic bearing 22. The rubber-elastic bearing 22 has an accordion-like connection element 23 which connects the second portion 24 of the rubber-elastic bearing 22 to the first portion 25. A joining aid 27 is in turn formed integrally on a second housing part 26, such that when the drive unit 18 is installed, it is possible to join the spherical head 21 and this joining can be assisted by a force from the joining aid 27.

FIG. 3 shows an alternative embodiment of a rubber-elastic bearing 28. The rubber-elastic bearing 28 connects a carrier component 29 to a housing 30, the joining aid 31 being integral with the rubber-elastic bearing 28 in this exemplary embodiment. In this exemplary embodiment, the rubber-elastic bearing 28 has two circumferential annular grooves 32, 33, a first annular groove 23 being connectable to the housing 30 and a second annular groove 32 being connectable to the carrier component 29. The rubber-elastic bearing 28 is usually connected to the housing 30 of the drive unit and installed on the carrier component 29. When joining the elastic bearing 28, secure and easy joining of the joining region 34 of the rubber-elastic bearing 28 can now be assisted and achieved by means of the joining aid 31.

LIST OF REFERENCE SIGNS 1, 18 drive unit
2 decoupled fastening
3, 19, 29 carrier component
4, 22, 28 rubber-elastic bearing
5, 25 first portion
6 first housing part
7, 26 second housing part
8, 30 housing
9, 23 connection element
10, 24, 34 second portion, joining region
11 recess
12, 27, 31 joining aid
13 dividing line
14 extension
15 axial end
16, 32, 33 annular groove
17 bore
20 cut-out
21 spherical head
A axis of symmetry
F force
S play

The invention claimed is:
1. A rubber-elastic bearing configured for decoupled fastening of a drive unit, in a motor vehicle, the rubber-elastic bearing comprising:
    a closed recess; and an interlocking connection configured to interlockingly hold the rubber-elastic bearing in a carrier component, wherein the rubber-elastic bearing is installed between a housing of the drive unit and the carrier component, wherein the interlocking connection is formed by a joining aid, wherein the joining aid extends into the closed recess at least in regions, wherein the joining aid ends at a distance from one end of the recess, wherein the distance corresponds to an elasticity of the rubber-elastic bearing such that elasticity of the rubber-elastic bearing is not restricted by the joining aid to allow maximal deformation of the rubber-elastic bearing, wherein the joining aid further ends within the recess at a second distance from the interlocking connection, wherein a side wall of the joining aid is spaced from an inner side wall of the rubber-elastic bearing defining the recess.

2. The rubber-elastic bearing according to claim 1, wherein the rubber-elastic bearing has indentations at least in regions, wherein the recess extends into a region of the indentation.

3. The rubber-elastic bearing according to claim 1, wherein a geometric shape of an end of the recess cooperates with a corresponding geometric shape of the joining aid.

4. The rubber-elastic bearing according to claim 1, wherein the rubber-elastic bearing is deformable.

5. The rubber-elastic bearing according to claim 1, wherein the rubber-elastic bearing is mounted in the housing between a first housing part and a second housing part.

6. The rubber-elastic bearing according to claim 5, wherein the joining aid is integral with the second housing part.

7. The rubber-elastic bearing according to claim 1, wherein the joining aid is integral with the rubber-elastic bearing.

8. The rubber-elastic bearing according to claim 1, wherein the rubber-elastic bearing has a connection element.

9. The rubber-elastic bearing according to claim 2, wherein the indentations are radial grooves.

10. The rubber-elastic bearing according to claim 8, wherein the connection element has an accordion shape.

11. The rubber-elastic bearing according to claim 8, wherein the connection element has a stepped hollow-cylindrical profile.

12. The rubber-elastic bearing according to claim 8, wherein the connection element surrounds the joining aid.

13. The rubber-elastic bearing according to claim 1, wherein the joining aid has a tapering shape toward the carrier component.

14. The rubber-elastic bearing according to claim 1, wherein the rubber-elastic bearing and the joining aid are symmetrical.

15. The rubber-elastic bearing according to claim 1, wherein the rubber-elastic bearing has an annular groove that circumferentially surrounds a bore formed in the carrier component.

16. The rubber-elastic bearing according to claim 15, wherein the rubber-elastic bearing has a joining region that receives an axial end of the joining aid, the joining region being configured to enable play of the axial end without impairing elasticity of the rubber-elastic bearing.

17. The rubber-elastic bearing according to claim 1, wherein an axial end of the joining aid is spaced from an axial end of the rubber-elastic bearing that is proximate the axial end of the joining aid when the joining aid is inserted in the rubber-elastic bearing.

18. The rubber-elastic bearing according to claim 8, wherein the connection element has a hollow-cylindrical profile, wherein the joining aid has a cylindrical profile, and wherein the entire circular wall of the joining aid is spaced from the interior wall of the connection element.

* * * * *